(12) United States Patent
Duenyas

(10) Patent No.: US 8,427,984 B2
(45) Date of Patent: Apr. 23, 2013

(54) METHOD AND SYSTEM FOR ANTENNA SWITCHING

(75) Inventor: Izhak Duenyas, Rechovot (IL)

(73) Assignee: SparkMotion Inc., Ottawa (CA)

(*) Notice: Subject to any disclaimer, the term of this patent is extended or adjusted under 35 U.S.C. 154(b) by 524 days.

(21) Appl. No.: 12/685,758

(22) Filed: Jan. 12, 2010

(65) Prior Publication Data
US 2010/0177655 A1 Jul. 15, 2010

Related U.S. Application Data

(60) Provisional application No. 61/143,849, filed on Jan. 12, 2009.

(51) Int. Cl.
*H04B 7/00* (2006.01)
(52) U.S. Cl.
USPC .......................................................... 370/310
(58) Field of Classification Search .................. 370/310, 370/328, 334, 339; 455/422, 500, 126, 130, 455/132, 226
See application file for complete search history.

(56) References Cited

U.S. PATENT DOCUMENTS

| | | | | |
|---|---|---|---|---|
| 4,977,616 A | * | 12/1990 | Linder et al. | 455/277.2 |
| 5,491,723 A | * | 2/1996 | Diepstraten | 375/267 |
| 5,960,046 A | * | 9/1999 | Morris et al. | 375/347 |
| 6,032,033 A | * | 2/2000 | Morris et al. | 455/277.2 |
| 6,118,773 A | * | 9/2000 | Todd | 370/334 |
| 7,047,046 B2 | * | 5/2006 | Hoffmann et al. | 455/562.1 |
| 7,453,924 B2 | * | 11/2008 | Sasaki et al. | 375/148 |
| 7,492,749 B2 | * | 2/2009 | Song et al. | 370/342 |
| 7,646,822 B2 | * | 1/2010 | Kobayashi et al. | 375/267 |
| 2002/0122393 A1 | * | 9/2002 | Caldwell et al. | 370/328 |
| 2002/0160737 A1 | * | 10/2002 | Crawford | 455/272 |
| 2003/0054763 A1 | | 3/2003 | Judd et al. | |

OTHER PUBLICATIONS

WiMAX "Mobile WiMAX—Part I: A Technical Overview and Performance Evaluation", WiMAX Forum, p. 1-53, Aug. 2006.

* cited by examiner

*Primary Examiner* — Dmitry H Levitan
(74) *Attorney, Agent, or Firm* — Procopio, Cory, Hargreaves & Savitch LLP

(57) ABSTRACT

A client terminal, such as a customer premises equipment (CPE), for receiving a communication signal in a plurality of reception configurations. The client terminal comprises an antenna unit having a plurality of reception configurations for receiving communication signal having a plurality of frames, each the frame having a predefined frame segment, a receiver, a switching module configured for switching between operational and testing receptions of the communication signal respectively by the receiver via the antenna unit in operational and testing configurations, and a timing circuit configured for timing the switching during the operational reception to allow the receiver to receive the testing reception when the predefined frame segment is received via the antenna unit in operational configuration.

21 Claims, 8 Drawing Sheets

| For time Stamp 1 | | | | | | | |
|---|---|---|---|---|---|---|---|
| B7 | B6 | B5 | B4 | B3 | B2 | B1 | B0 |
| GPIO-7 | GPIO-6 | GPIO-5 | GPIO-4 | GPIO-3 | GPIO-2 | GPIO-1 | |
| | Receiver 2 | | | Receiver 1 | | | |

| For time Stamp 2 | | | | | | | |
|---|---|---|---|---|---|---|---|
| B7 | B6 | B5 | B4 | B3 | B2 | B1 | B0 |
| GPIO-7 | GPIO-6 | GPIO-5 | GPIO-4 | GPIO-3 | GPIO-2 | GPIO-1 | |
| | Receiver 2 | | | Receiver 1 | | | |

| For time Stamp 3 | | | | | | | |
|---|---|---|---|---|---|---|---|
| B7 | B6 | B5 | B4 | B3 | B2 | B1 | B0 |
| GPIO-8 | GPIO-3 | GPIO-2 | GPIO-1 | GPIO-8 | GPIO-3 | GPIO-2 | GPIO-1 |
| | | | Transmitter 1 | | | | |

FIG. 6

METHOD AND SYSTEM FOR ANTENNA SWITCHING

RELATED APPLICATION

This application claims the benefit of priority from U.S. Provisional Patent Application No. 61/143,849 filed on Jan. 12, 2009, the contents of which are incorporated herein by reference.

FIELD AND BACKGROUND OF THE INVENTION

The present invention, in some embodiments thereof, relates to wireless communication networks and, more particularly, but not exclusively, to a method and an apparatus for switching between a plurality of antennas during a communication session.

A number of standards have been developed in recent years for providing wireless network access. These include such standards as the IEEE 802.16 family (i.e., WirelessMAN, also known as worldwide interoperability for microwave access (WiMAX), HIPERMAN, wireless broadband (WiBro), and $3^{rd}$ generation partnership project (3GPP) systems generally, which the standards thereof are incorporated herein by reference. These standards provide a wireless network access to remote users via client terminals, such as customer-provided equipments (CPEs), for example WiMAX or Wi-Fi modems. These CPEs are usually located at a subscribers premises and connected with carriers telecommunication channels at the demarcation point.

During the last decade, the requirement for CPEs that supports high speed data traffic, such as videoconference, file streaming, video-on-demand, and the interactive video game, has increased. As commonly known, the data rate of a wireless channel equals to a product of the wireless channel's spectrum width and the spectrum efficiency. As the frequency resource is limited, improving the spectrum efficiency of the adopted technology is a feasible solution.

CPEs which use multiple antennas to improve the performance of radio communication systems, such as multiple input and multiple-output (MIMO) based CPEs, provide a promising solution for improving the spectrum efficiency. However, these antennas, as other antennas, encounter communication difficulties such as fading conditions. If fading conditions are significant, and compensation cannot be made at the client terminal, the informational content of the data cannot be successfully recovered and the quality of service (QoS) decreases.

Various diversity schemes have been developed and utilized to compensate for fading. Generally, diversity schemes increase the redundancy of data throughput that is sent to the client terminals. Increasing the time redundancy of the data, for instance, increases the likelihood that the informational content of the data may be recovered when received at a receiving station. Another developed scheme is space diversity with multiple antennas. When space diversity is created, data that is communicated by a sending station to a receiving station is communicated by way of different communication paths via different antennas. Fading conditions along the separate communication paths might differ, and fading of data communicated upon one communication path to prevent its successful delivery might be compensated for by successful delivery of the data communicated along another communication path.

Compensation can also be made for fading conditions by increasing the power level at which data is communicated by a transmitting station. By increasing the power of the transmitted data, data values, of increased power levels, are more likely to be detectable at a receiving station, even when communicated upon a fading channel.

An example for compensating for the effects of fading is provided in U.S. Patent Application Publication Number 2005/0245280 published on Nov. 3, 2005. This patent application describes a method in which an analysis is made at a receiving station, such as through channel estimation by a channel estimator, of communication conditions on different sub-channels, defined by different communication paths upon which data streams are communicated to the receiving station from different transmit antenna transducers. Power controllers generate power change requests responsive to the channel estimations. The power change requests are returned to a sending station by way of a feedback channel. In addition, the power levels at which data is transmitted from different transmit antennas is correspondingly changed.

SUMMARY OF THE INVENTION

According to some embodiments of the present invention there is provided a client terminal for receiving a communication signal in a plurality of reception configurations. The client terminal comprises an antenna unit having a plurality of reception configurations for receiving communication signal having a plurality of frames, each the frame having a predefined frame segment, a receiver, a switching module configured for switching between operational and testing receptions of the communication signal respectively by the receiver via the antenna unit in operational and testing configurations, and a timing circuit configured for timing the switching during the operational reception to allow the receiver to receive the testing reception when the predefined frame segment is received via the antenna unit in operational configuration.

Optionally, antenna unit comprises a plurality of antennas and in the operational and testing configurations the receiver is connected to operational and tested antennas of the plurality of antennas.

Optionally, the client terminal further comprises an analysis module configured for performing a quality analysis of the operational and tested receptions.

More optionally, the switching between the operational and tested receptions according to the quality analysis.

Optionally, timing circuit synchronizes the switching to be performed every predefined number of frames.

More optionally, the quality analysis comprises at least one of the following analyses: a signal to noise ratio (SNR) analysis, and a received signal strength indication (RSSI).

Optionally, the client terminal further comprises an additional receiver configured for receiving an additional reception of the frame based communication signal via an additional antenna unit and an analysis module configured for performing a quality analysis of the operational reception according to an additional reception via the additional antenna unit.

Optionally, predefined frame segment is a predefined frame segment of network management data.

Optionally, predefined frame segment is a frame preamble.

Optionally, antenna unit comprises a plurality of antennas and a selector for connecting a subset of the plurality of antennas to the receiver.

More optionally, each the antenna is a directional antenna.

Optionally, the client terminal further comprises a memory unit for recording from the operational reception a respective frame segment in at least one of a frame prior to the frame of the predefined frame segment and a frame subsequent to the frame of the predefined frame segment for allow using the respective frame segment instead of the predefined frame segment.

According to some embodiments of the present invention there is provided a method for receiving a communication signal via a plurality of antennas. The method comprises connecting a receiver to receive an operational reception of a communication signal having a plurality of frames via an operational antenna, switching the receiver to receive a tested reception via a tested antenna when the operational reception is of a predefined frame segment of a frame from the plurality of frames, performing a quality analysis of the tested reception, and selectively connecting the receiver to the tested antenna for a prospective reception of the communication signal if the quality analysis being indicative of a preferability of the tested reception over the operational reception.

Optionally, the receiving comprises recording a prior frame segment preceding to the predefined frame segment, further comprising using the prior frame segment for recovering from the switching.

Optionally, the predefined frame segment is selected from a group consisting of a DL preamble of a frame of the communication signal, a DL midample, and a pilot tone.

Optionally, the method further comprises repeating the method steps, wherein the operational antenna is defined according to a connection made in the selectively connecting step.

More optionally, the repeating is performed every predefined number of frames.

More optionally, the method further comprises providing a plurality of antennas before the receiving and repeating the method steps in a plurality of iterations; wherein in each the iteration the operational antenna is defined according to an analysis made in selectively connecting and the tested antenna being sequentially selected from the plurality of antennas.

Optionally, the connecting of receiving comprises scanning a plurality of frequencies and tuning the receiver according to the scan.

Optionally, the quality analysis comprises at least one of the following analyses: a signal to noise ratio (SNR) analysis, and a received signal strength indication (RSSI).

Optionally, the switching is initiated between two of the plurality of frames.

Optionally, the switching is terminated before the predefined frame segment is completely received by the receiver.

According to some embodiments of the present invention there is provided a method for receiving a communication signal communication signal via a plurality of antennas. The method comprises using an operational connection between a receiver and an operational antenna to allow the receiver to receive a communication signal having a plurality of frames separately via the operational connection, switching to a tested connection between a tested antenna and the receiver to allow the receiver to receive a predefined frame segment from one of the plurality of frames separately via the tested connection when the operational antenna receiving the predefined frame segment, performing a quality analysis of the tested connection, and selecting between the operational and tested connections according to the quality analysis.

According to some embodiments of the present invention there is provided a client terminal for receiving a communication link via a plurality of antennas. The client terminal comprises a plurality of antennas configured for receiving communication link having a plurality of frames, each the frame having a predefined frame segment, a receiver, a switching module configured for switching between any reception of the communication link respectively by the receiver via any of the plurality of antennas, and a timing circuit configured for timing the switching during the first reception to allow the receiver to receive the second reception when the predefined frame segment is received via the first antenna.

According to some embodiments of the present invention there is provided a method for receiving a communication signal via an antenna unit having a plurality of reception configuration. The method comprises connecting a receiver to receive an operational reception of a communication signal having a plurality of frames via the antenna unit in an operational reception configuration, switching the receiver to receive a tested reception via a tested reception configuration of the antenna unit when the operational reception is of a predefined frame segment of a frame from the plurality of frames, performing a quality analysis of the tested reception, and selectively connecting the receiver to the antenna unit in a tested reception configuration for a prospective reception of the communication signal if the quality analysis being indicative of a preferability of the tested reception over the operational reception.

According to some embodiments of the present invention there is provided a client terminal for transmitting a communication signal in a plurality of configurations. The client terminal includes an antenna unit having a plurality of transmitting configurations for transmitting communication signal having a plurality of frames, wherein each frame having a predefined frame segment, a transmitter, a switching module configured for switching between operational and testing transmissions of the communication signal respectively by the transmitter via the antenna unit in operational and testing configurations, and a timing circuit configured for timing the switching during the operational transmission to allow the transmitter to transmit the testing transmission when the predefined frame segment is transmitted via the antenna unit in operational configuration.

According to some embodiments of the present invention there is provided a method for transmitting a communication signal via a plurality of antennas. The method comprises connecting a transmitter to transmit an operational transmission of a communication signal having a plurality of frames via an operational antenna, switching the transmitter to transmit a tested transmission via a tested antenna when the operational transmission is of a predefined frame segment of a frame from the plurality of frames, performing a quality analysis of the tested transmission, and selectively connecting the transmitter to the tested antenna for a prospective transmission of the communication signal if the quality analysis being indicative of a preferability of the tested transmission over the operational transmission.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a flash disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 is an exemplary representation of three bytes which are bytes are used to set GPIO values, according to some embodiments of the present invention.

DESCRIPTION OF EMBODIMENTS OF THE INVENTION

Figure 1A:
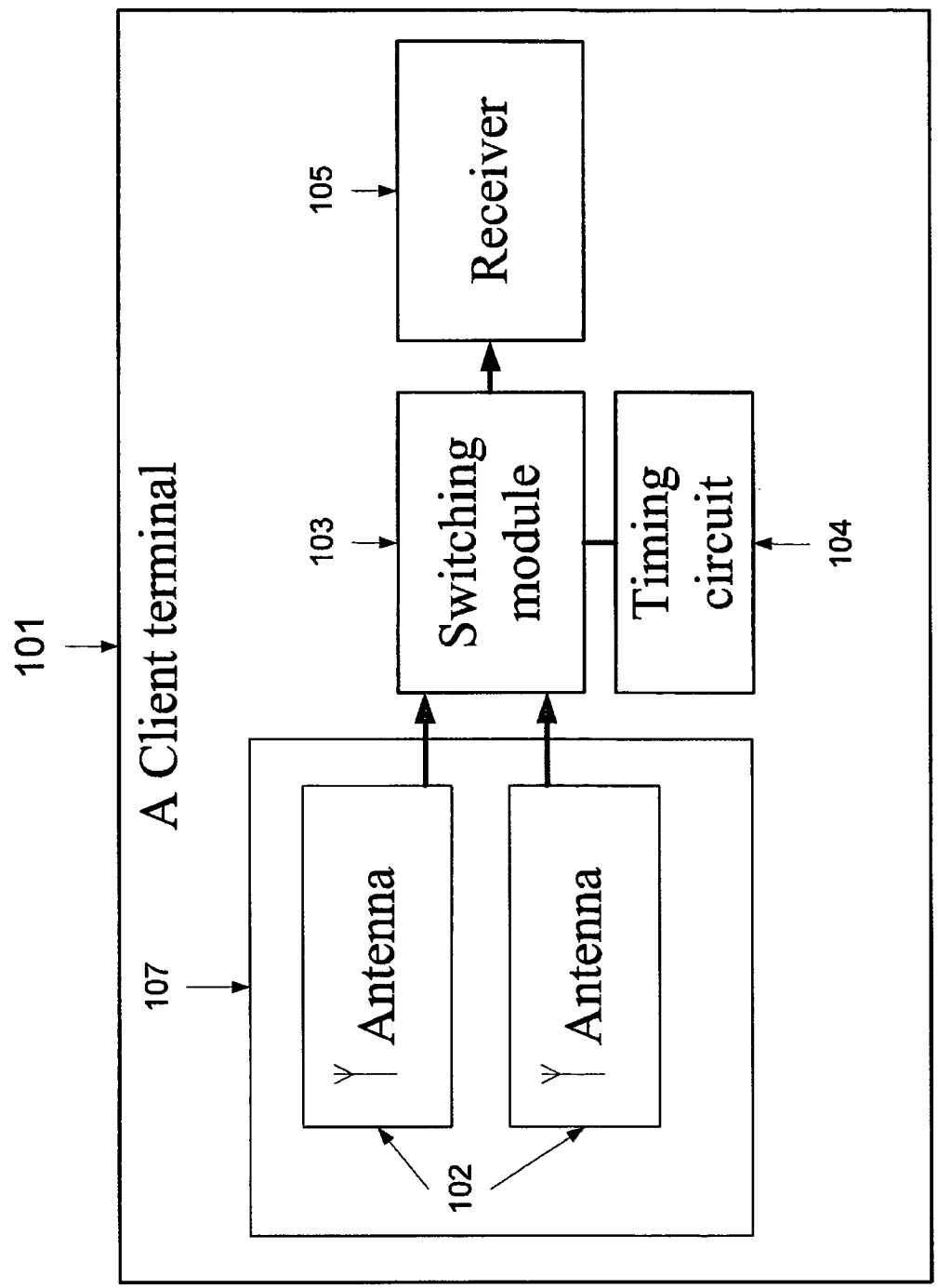
FIG. 1A is a schematic illustration of a client terminal, such as a CPE, according to some embodiments of the present invention.

The present invention, in some embodiments thereof, relates to wireless communication networks and, more particularly, but not exclusively, to a method and an apparatus for switching between a plurality of antennas during a communication session.

According to some embodiments of the present invention there is provided a client terminal and a method for synchronizing a reception quality analysis of an antenna that is selectively connected to a receiver without substantially interrupting and/or disconnecting a communication signal that is received via another antenna that is selectively connected to the receiver. Such a synchronizing allows connecting the receiver to the antenna that provides the most preferred reception to the receiver.

According to some embodiments of the present invention, the client terminal is a customer premises equipment (CPE), such as a WiMAX™ CPE, and the method is used for synchronizing a reception quality analysis of a communication signal that is defined according to the WiMAX™ physical layer (PHY), for example as described in an IEEE 802.16e standard that is incorporated herein by reference. Optionally, the reception quality analysis is performed by connecting operational and tested antennas in periodical switching intervals that occur in a frame segment that includes network management data, such as downlink (DL) preamble, control messages and data where the frame segment is received at via a tested antenna and the other information by the operational antenna. The quality parameters of a tested reception via the tested antenna are analyzed, for example by signal to noise ratio (SNR) analysis, and received signal strength indication (RSSI). In such an embodiment, a communication signal is maintained by switching among a number of antennas to allow best antenna using at any moment according to the reception quality they provide in a manner that allows avoiding and/or reducing a fading effect.

According to some embodiments of the present invention, the client terminal comprises a plurality of antenna sets. In such an embodiment, the client terminal may implement a multiple input and multiple-output (MIMO) communication model, such as MIMO on WiMAX™, for example as described in the IEEE 802.16 standards which are incorporated herein by reference. Optionally, the method may be implemented in 16e point to multi point wireless access systems, for example for fix nomadic self installed and mobile CPEs deployments.

According to some embodiments of the present invention, the method and the client terminal is designed to maintain a stable link under changed conditions in a link path between the client terminal and a network node, such as a base station, for example as a result of moving obstacles, such as moving trees, rain, client terminal continuously working in pedestrian and mobility environments and the like.

Optionally, the method allows automatic detection of a directional antenna, allowing a non professional user to install the client terminal without having to fine tune the orientation of the client terminal thereof and/or to perform measurements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
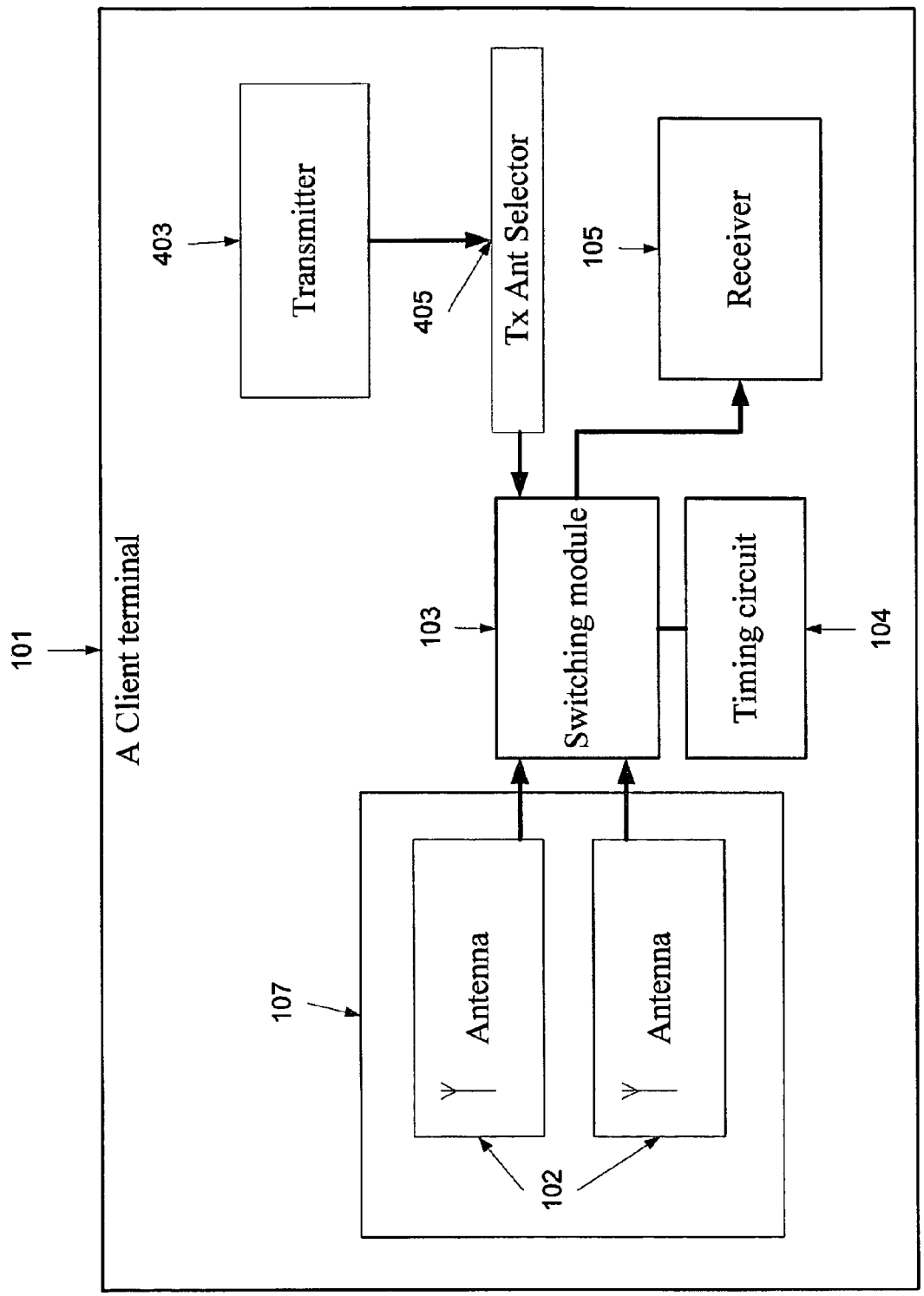
FIG. 1B is a schematic illustration of a client terminal as depicted in FIG. 1A having a transmitter, according to some embodiments of the present invention.

Reference is now made to FIG. 1, which is a schematic illustration of a client terminal 101, such as a CPE, according to some embodiments of the present invention. Optionally, the client terminal 101 is designed to establish a frame based communication signal, such as a communication channel, with a network node, such as a base station, for example a WiMAX base station. As used herein, a frame based communication signal, or communication signal, means a data link that comprises a plurality of frames and established for connecting the client terminal 101 to a network node, such as a base station, for the purpose of transmitting and/or receiving data. It should be noted that the frame based communication signal may be defined according to any frame based protocol, such as orthogonal frequency-division multiplexing (OFDM) and orthogonal frequency division multiple access (OFDMA) frames, for example a Wi-Fi™ protocol, code division multiple access (CDMA) protocol, global system for mobile communications (GSM) protocol, long term evolution (LTE) protocol, universal mobile telecommunications system (UMTS) protocol, a Bluetooth™ protocol, and/or a ZigBee™ protocol.

As such, the client terminal 101 may be adapted to function as a desktop modem, a laptop, a Smartphone, or a personal digital assistant (PDA) modem with an integrated mobile WiMAX modem and/or as a wireless modem, such as a WiMAX™ wireless fidelity (Wi-Fi)™ converter.

As outlined above and further described below, the communication signal comprises a plurality of frames. Each frame comprises different frame segments. A frame segment may comprise network management data, such as physical-layer procedures data, for example a downlink (DL) preamble frame segment of a WiMAX™ or LTE frame or a Pilot tone or user data, for example payload and user overhead information.

Figure 3:
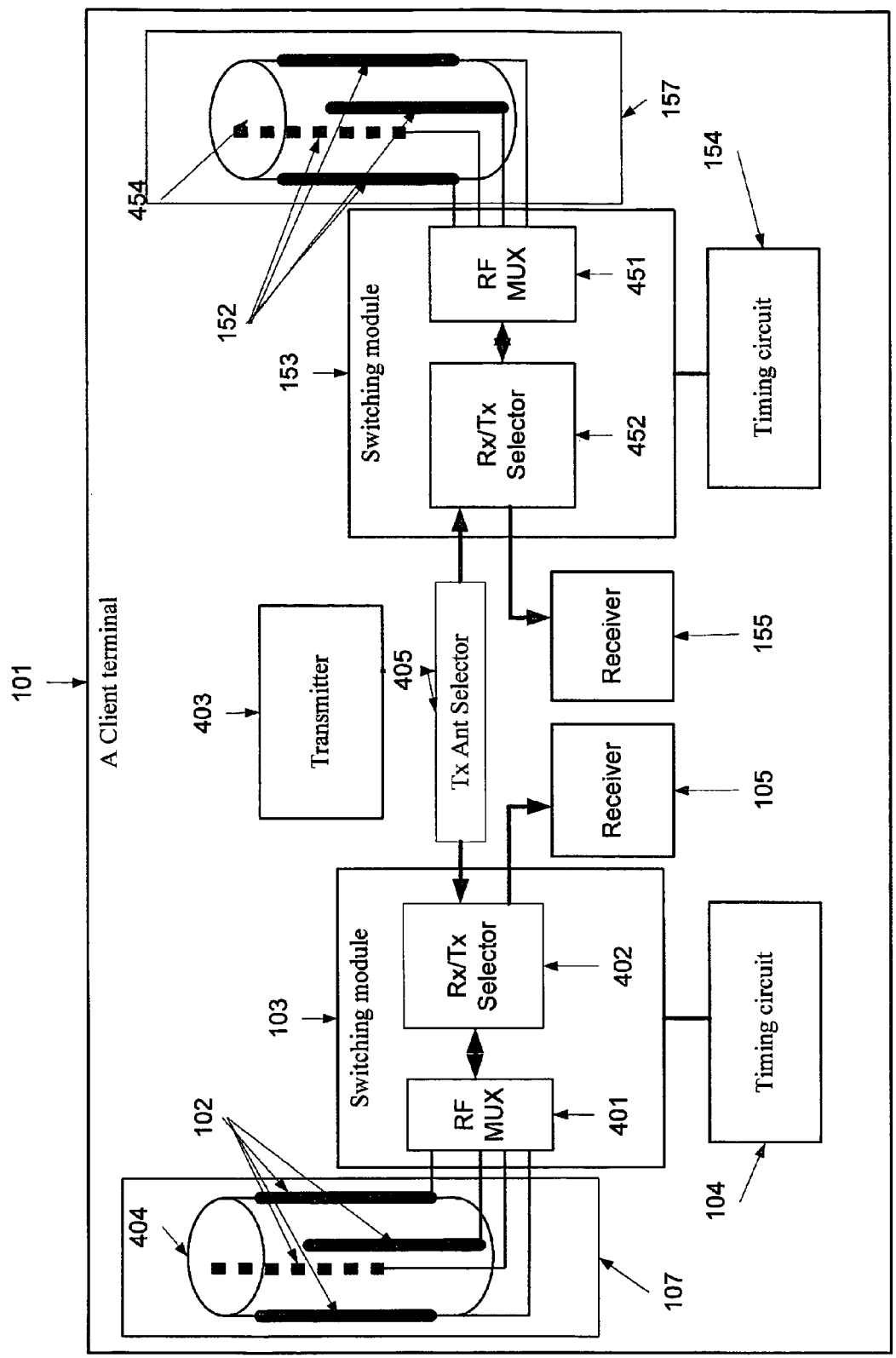
FIG. 3 is a schematic illustration of a client terminal having multiple sets of antennas connected to 2 receivers and 1 transmitter to improve the link performances, according to some embodiments of the present invention.
Figure 5:
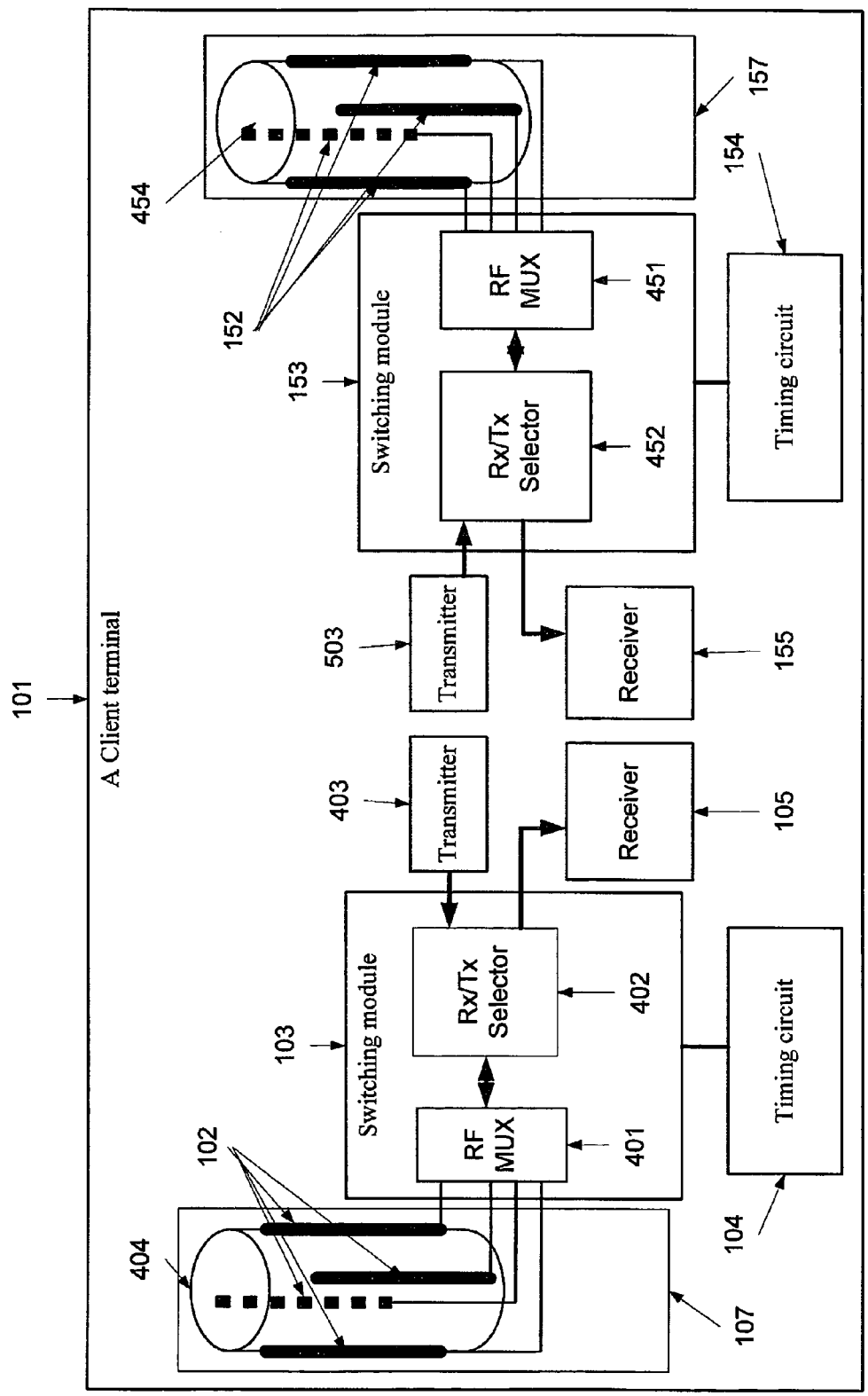
FIG. 5 is a schematic illustration of a client terminal having multiple sets of antennas to improve link performances when used two receivers and two transmitters, according to some embodiments of the present invention.

The client terminal 101 comprises a receiver 105, such as a single band or a multiband WiMAX™ or LTE receiver, and an antenna unit 107 having a plurality of reception configurations, such as a plurality of antennas 102 which are connected to a switching module 103 that selects one or more antennas 102. According to some embodiments of the present invention, the switching module 103 may be included or integrated in antenna unit, such as the antenna unit 107 and/or connected thereto. Additionally or alternatively, the antenna unit 107 may include one or more antennas having a reception pattern that may be selected by the switching module 103, for example by application of control signals, such as switching of PIN diodes internal to the antenna. As used herein, a reception configuration means an antenna reception structure, an antenna reception pattern, antenna reception amplification, a power feed and/or any other configuration that has an effect on the reception of the communication signal. According to some embodiments, the antenna unit 107 comprises a plurality of omnidirectional spaced-apart antennas and/or directional antennas, such as 60°, 90° or any other angular directional antennas collectively covering large angular span, preferably 360 degrees, to compensate for the lack of knowledge about the anticipated direction of arrival of the signal. The use of spaced-apart omnidirectional antennas and/or directional antennas creates an advantageous diversity effect, either space diversity or angular diversity, respectively. In an exemplary embodiment, the client terminal 101 may comprise two sets of four or six antennas any set is connected to a separate a receiver and/or transmitter, for example as shown at FIGS. 3 and 5. The set of antennas of the antenna unit 107 on location 404 and/or the set of antennas of an additional antenna unit 157 on location 454 may be positioned on an antenna towers or located internally around the cage or located externally to the cage inside a radome. The antenna unit 107 may be controlled by a parallel interface, a serial interface, and/or by a coaxial cable (coax) that includes a serial interface for antenna switching control, for example using an amplitude shift keying (ASK) protocol. The control may be used for selecting the configuration of the antenna unit, for example by selecting a receiving and/or a transmitting antenna and/or antenna circuitry power feeding. Optionally, the antennas of the antenna units 107 and 157 in FIG. 3 may be vertically-polarized, horizontally-polarized, circular polarized, slant-linearly-polarized or a combination of the above, to provide for polarization diversity or for MIMO operation. Optionally, different configurations of the antenna unit 107 may include any of the above reception states.

The antenna units may be at diverse locations as exemplified by locations 404 and 454 of FIG. 3, and/or on in any other arrangement that allows them to receive Radio Frequency (RF) signals that carry the communication signal from a remote wireless network node, such as a WiMAX™ base station. As further described below and depicted in FIG. 1B and FIG. 3, each one of the set of antennas may be connected to a transmitter 403 that allows generating RF signals and transmitting them to the base station, for example via the aforementioned multiplexer. Optionally, the transmitter is connected via an antenna selector that allows synchronizing the transmission according to the quality analysis which is outlined above and described below. It should be noted that the communication may be established in a line-of-sight environment and/or in a non line of sight environment. Optionally, the antenna unit 107 comprises a set of antennas which are high-gain directional antennas for improving the communication range and the operational MCS rate for maximal throughput operation. It should be noted that using a set of directional and/or dual slant antennas instead of omnidirectional antenna may increase the physical gain from approximately 2 decibel isotropic (dBi) to approximately 7-9 dBi and reduce or prevent multi path problems pertaining to omnidirectional antennas.

The client terminal 101 further comprises a switching module 103 that switches between operational and tested receptions which are received via the operational and tested antennas. The switching module 103 may comprise and/or connected to a multiplexer that is positioned between the antennas 102 and the receiver 105, for example as depicted in numeral 401 of FIG. 3. The switching module 103 may separately forward each one of the receptions to the receiver 105 at the time, for example as described below. The client terminal 101 further comprises a timing circuit 104 for timing the switching of the switching module. Optionally, the timing circuit 104 triggers the switching during a reception from an operational antenna to allow the receiver to receive a reception of the communication signal via a tested antenna. The triggering may be performed when a predefined frame segment is received via the operational antenna, for example as described below. As used herein, an operational antenna is an antenna through which the communication signals are received and a tested antenna is an antenna through which a frame segment is received during the periodical switching interval. Clearly, during the course of operation, each one of the antennas 102 may be an operational antenna or a tested antenna.

In order to avoid user data lose, the switching may be performed when the antenna receives a frame segment of a frame of the communication signal that includes network management data, such as DL preamble, DL Midamble, Pilot tones and/or any quality measurement indicators. As the network management data is repeated in most of the consecutive frames of the communication signal, it may be recovered with relativity high probability by analyzing respective frame segments of preceding and/or following frames, for example as described below.

As outlined above, the communication signal may be defined according to the LTE or WiMAX™ physical layer (PHY), for example as described in an IEEE 802.16 standard that is incorporated herein by reference. In the IEEE 802.16 standard, each frame may be constructed as with data management frame segments, such as a downlink (DL) frame segment that is followed by an (UL) uplink frame segment after an interlude, also known as a guard interval. The size ratio of the frame segments may vary to support different traffic profiles, for example using any DL/UL TDD ratio between 3:1 and 1:3. The DL frame segment begins with a DL preamble that is used for physical-layer procedures, such as time and frequency synchronization and initial channel estimation. The DL preamble is followed by a frame control header (FCH), which provides frame configuration information, such as a MAP message modulation, and coding scheme, and the usable subcarriers. In such an embodiment, the frame segment during or before which the switching unit 103 switches between receptions from tested antenna to the operational antenna is the DL preamble of the frame. Optionally, the switching is ended before the frame segment is ended, for example before the DL preamble is ended.

In some embodiments of the present invention, the switching module is designed to connect an antenna of the set of antennas of the antenna unit 107 according to the outputs of an analysis module that is designed to analyze one or more quality parameters, such as SNR and RSSI of the aforementioned receptions.

Figure 2:
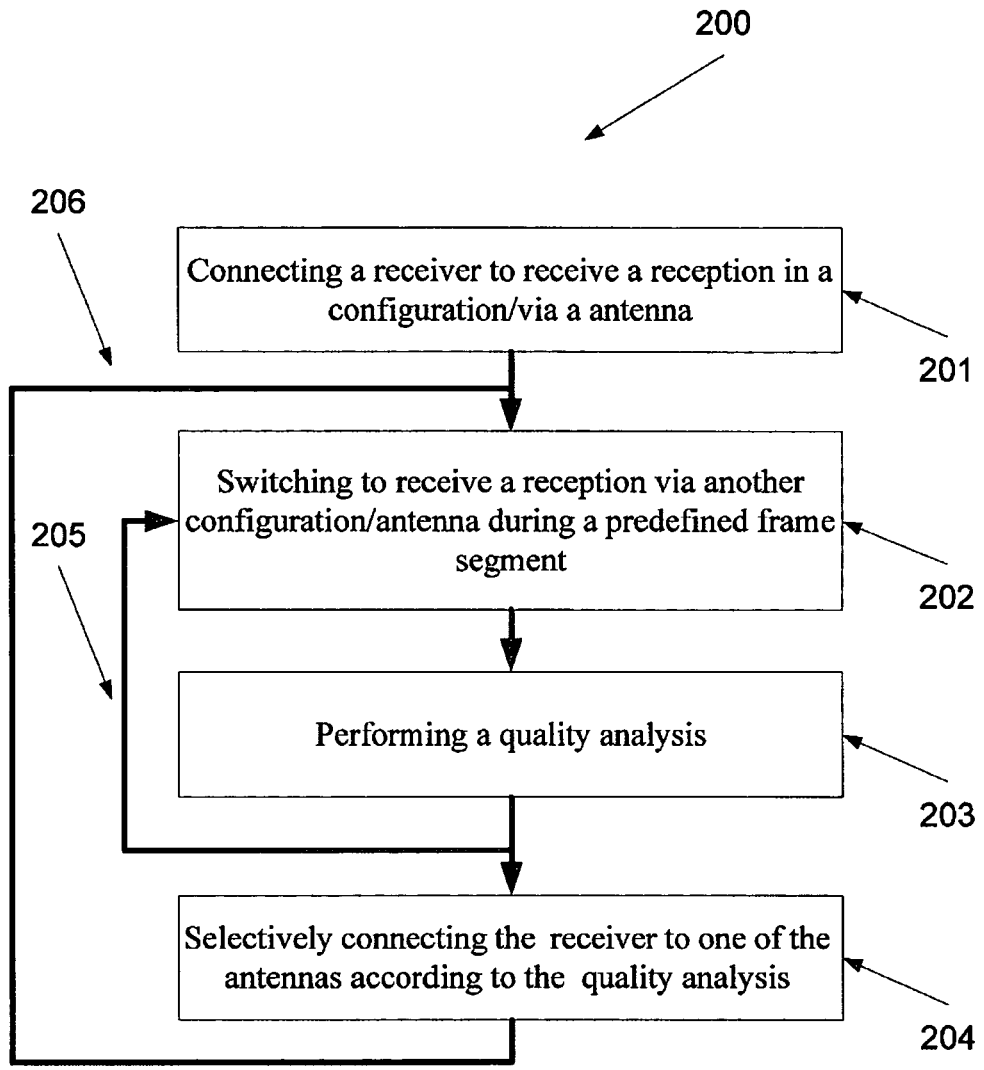
FIG. 2 is a flowchart of a method for switching between a plurality of antennas, according to some embodiments of the present invention.

Reference is also now made to FIG. 2, which is a flowchart of a method for switching between antennas or antenna configurations, such as members of the set of antennas of the antenna unit 107, according to some embodiments of the present invention. Though the section below describes antenna switching, the method may be used, mutatis mutandis for switching among reception configurations of the antenna unit, for example by changing the reception structure, the reception pattern, feed power and/or any other reception configuration which is described above. The method may used as a fast and opportunistic switching mechanism for increasing and/or maximizing the reception efficiency of the client terminal 101, overcoming fading of the communication signal reception and/or preventing or diminishing a decrease in the performance of a scheduling algorithm that takes channel quality and/or QoS demand of the users into account, such as a maximum carrier-to-noise ratio (CNR) and HARQ algorithm for best scheduling (MCS) algorithm. By implementing the method in a plurality of client terminals of a wireless communication network, such as WiMAX™ or LTE CPEs, the infrastructure deployment may be improved, for instance by reducing the number of base stations (BSs) which are installed per area, such as a communication cell.

First, as shown at 201, the receiver 105 is connected to one of the antennas of the antenna unit 107, optionally after a network entry process. Such a connection allows the receiver to receive and analyze the communication signal. Optionally, the receiver is connected to the antenna that receives communication signal with a reception quality parameter, such as an SNR, an RSSI and/or any other reception quality parameter, or a combination of reception quality parameters, which is indicative of the preferability of a reception via a certain antenna over via other antennas. Optionally, the network entry process includes scanning a plurality of frequencies in a predefined ranges supported by different CPE platforms in frequency ranges such as 2.3-2.7 GHz, 3.3-3.8 GHz and 4.9-5.95 GHz and/or in any other applicable frequency ranges, to determine a reception of the best frequency or the best preferred BS. Optionally, the receiver 105 is connected according to a network entry process in which all the antennas of the antenna unit 107 are scanned in a plurality of frequencies to determine an antenna and a frequency for establishing the communication signal. Optionally, the network entry process is performed automatically, for instance when initializing and/or resetting the client terminal 101. Such a network entry process allows installing the client terminal without setting and/or tuning the direction of the antennas of the antenna unit 107. The scanning may be used for detecting a preferred BS subnet, tuning the receiver according to the scan, and selecting a best network node, such as a base station (BS) from the preferred subnet to allow an access system operator to consider BSs load balancing.

Now, after a connection between a certain antenna and the receiver 105 is established and the communication signal is received by the receiver, the switching module 103 connects the receiver to another member of the set of antennas of the antenna unit 107 in periodical switching intervals, as shown at 202. The periodical switching intervals are timed according to a predefined frame segment of frames which are transmitted in the signals of the communication signal. As outlined above and described below, the frame segment is optionally a frame segment that includes network management data, such as a DL preamble. Optionally, the switching timing is controlled by the aforementioned timing circuit 104. For clarity, an antenna which is connected during a periodical switching interval may be referred to as a switched antenna.

Optionally, a periodical switching interval is timed every predefined number of frames. The receiver 105 may be switched between various antennas of the antenna unit 107 located on 404 in frames 2, 4, 6, 8 and the like to check the neighboring antennas performances. Optionally, if an additional set of receiver and antennas is provided, for example as described in FIG. 3, the additional receiver 155 is switched to antennas array 152 located on 454 in frames 1, 3, 5, 7 and the like to check the neighboring antennas performances. Optionally, the receivers 105 and 155 may be switched between various antennas of the antenna unit 107 located on 404 and set 152 located on 454 appropriately and simultaneously in the same frames.

Optionally, the frame segments of frames which are received between the periodical switching intervals are recorded for recovering loss of data occurred during the periodical switching intervals. For example, if the periodical switching interval is synchronized with a DL preamble of every tested frame, the DL preamble of every preceding frame is recorded for the recovering thereof. Optionally, a plurality of members of the antennas of the antenna unit 107 are connected in consecutive periodical switching intervals. For example, if the set of antennas comprises four 90° directional antennas or six 60° directional antennas and the receiver is connected to receive the communication signal via the operational antenna, in the first periodical switching interval the tested antenna is connected, in the second periodical switching interval the third antenna is connected, in the third periodical switching interval the fourth antenna is connected and so on and so forth.

In some embodiments of the present invention, the set of antennas is connected, optionally via two different multiplexers, to two receivers (not shown). In such an embodiment, while one receiver is connected to a switched antenna during a periodical switching interval, the other is synchronized to the antenna through which the communication signal is received and vice versa. Optionally, the data that is received via these two receivers is combined to form a uniform reception of the communication signal.

As shown at 203, a quality analysis is performed during each one of the periodical switching intervals, which optionally occur during the DL preamble, as described above. The quality analysis estimates one or more reception quality parameters of a reception via the switched antenna that is connected to the receiver 105 during the periodical switching interval. Optionally, a quality analysis module is connected to the receiver 105 and analyses its reception according to the timing of the periodical switching intervals. Optionally, the one or more reception quality parameters include SNR, RSSI, and/or any other reception quality parameter that is indicative of the quality of reception via one of the switched antenna.

Optionally, as shown at 205, the quality analysis is performed for receptions from a plurality of the members of the antennas of the antenna unit 107. As described above, the reception via different antennas may be estimated in a set of consecutive periodical switching intervals. In each periodical switching interval a respective quality analysis is performed and the outcome of the quality analysis is optionally stored in a memory unit of the client terminal (not shown).

Now, as shown at 204, the receiver is connected for receiving the communication signal via a selected antenna that has preferred reception quality parameters. The selected antenna may be the antenna from which the communication signal is currently received, for example as shown at 201, or a member of the set of antennas of the antenna unit 107 that have been analyzed in 103. For example, if the SNR that is estimated during the quality analysis of 203 is higher than the SNR of a reception via the antenna from which the communication signal is currently received, the receiver may be connected to the switched antenna if the alternative antenna's signal is related to the original BS used. Optionally, as described in 205, a number of quality analyses are performed, each to a reception via a different antenna. In such an embodiment, the receiver is connected to the antenna that a reception through with estimated with the highest outcome during the aforementioned quality analysis.

As shown at 206, the switching process that is depicted in 202-205 may be repeated in a plurality of iterations while the communication signal is established with a network node, such as a base station, for example as described above. In such a manner, the receiver 105 is substantially constantly connected via an antenna of the set of antennas of the antenna unit 107 that has the highest or otherwise most preferred reception quality, for example the best SNR, BER, RSSI, or a combination thereof, while receiving the communication signal.

Reference is now also made to FIG. 3, which is a schematic illustration of a client terminal 100 having multiple sets of antennas of the antenna unit 107, 157 to improve its performances, according to some embodiments of the present invention. In such an embodiment, the client terminal 101 may implement a MIMO communication model, such as MIMO on WiMAX™, for example as described in standard IEEE 802.16e standard, which is incorporated herein by reference. In such an embodiment, the client terminal 101 further comprises at an additional set of antennas 152, additional switching modules 103 and 153, and an additional receiver 155. Optionally, each one of the sets of antennas of the antenna units 107, 157 is arranged on one of directional antenna structures mentioned above. Each antenna complex is connected via a respective multiplexer 401, 451 a respective receiver 105, 155.

Optionally, each one of the switching modules 103, 153 separately switches between the members of the set of antennas of the antenna units 107, 157 which are connected to the receivers 105, 155. In such a manner, the MIMO communication model is optimized.

As shown at FIG. 3, the client terminal 101 comprises a transmitter 403. The transmitter 403 is optionally connected to a transmitter (Tx) antenna selector 405. The transmitter antenna selector 405 switches between the first and second set of antennas of the antenna units 107, 157 for transmitting the signals of the transmitter 403 in the best path to the BS. Optionally, the transmitter antenna selector 405 switches every frame and/or every number of frames, for example 2, 5, 10, 15, 20, 50, 100 or any intermediate number of frames between the set of antennas of the antenna units 102, 152. Such an alternating transmitter antenna selection may improve the multi path treatment.

Optionally, the transmitting set of antennas of the antenna units 107, 157 is selected according to the outcome of the quality analysis that has been performed, for example as described in relation to FIG. 2, for selecting a receiving antenna. For example, the outcome of the quality analysis of the selected antenna in the first set of the first antenna unit 107 is matched with the quality analysis of the selected antenna in the second set of the second antenna unit 157. In such a manner, the transmitter antenna selector 405 may select an antenna that has the highest and/or otherwise preferred reception quality parameters without performing additional signal analysis.

In some embodiments of the present invention, for example as shown at FIG. 5, the client terminal comprises separate transmitters 403, 503, each separately connected to one of the sets of antennas of antenna units 107, 157. In such an embodiment, the transmitter antenna selector 405 may not be used.

Optionally, the transmitter antenna selector 405 is connected to the switching modules 103, 153. In such an embodiment, the transmitting antenna may be selected according to the quality analysis that is performed during the periodical switching intervals, for example as described above. Optionally, the switching modules 103, 153 comprise a receiving (Rx)/Transmitting (Tx) selector 402, 452 for selecting an Rx and Tx antenna according to the aforementioned quality analysis, for example as described above in relation to FIG. 2. In such a manner, the signals of the transmitter 405 are transmitted via the antenna that has been estimated as receiving the communication signal with the best reception quality parameters, such as best SNR. It should be noted that though FIG. 2 describes reception operations and switching, it may be implemented, mutatis mutandis, for synchronizing a transmission.

According to some embodiments of the present invention, the reception of one receiver 105 is used for a quality analysis of another receiver 155 and optionally vice versa. As both receptions are acquired from signals transmitted from a common base station, quality parameters of one reception may be used for analyzing the other. This may be used as redundancy scheme in case of failure of one of the receiving path.

According to some embodiments of the present invention, the switching timing is controlled by configuring the general-purpose input/output (GPIO) lines, for example by the Rx/Tx selector 402, 452. As described above, the periodical switching intervals are performed when a predefined frame segment, such as a DL preamble is received. Optionally, two sets of GPIOs are used in order to implement antenna switching during these periodical switching intervals, for example as described above. Optionally, 8 GPIO lines are used to support switching between two antennas.

Optionally when external antennas complex is used the 8 GPIO lines may be converted to serial control interface using a RS-422 or RS-485 or RS-232 protocol or using an ASK analog protocol when the serial control interface is provided over the RF coax.

Figure 4A:
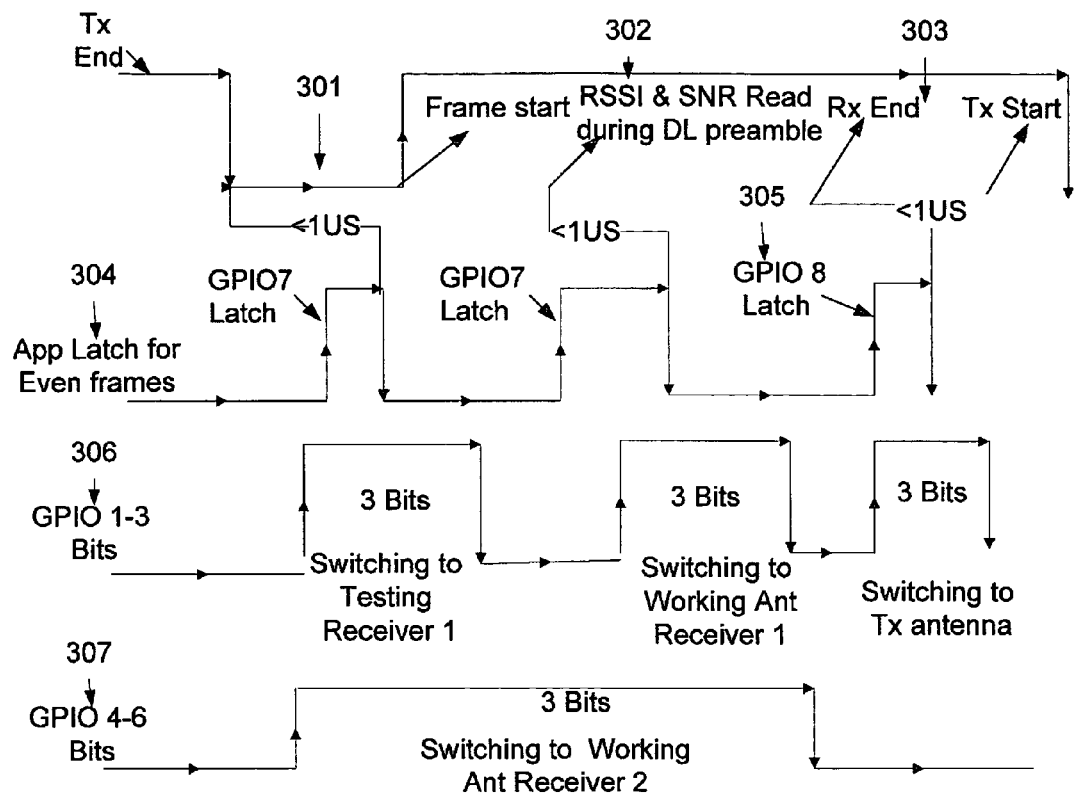
FIG. 4A is a time sequence diagram of an operation of general purpose input/output (GPIO) lines of a client terminal having two receivers and switching units, for example as depicted in FIG. 3, according to some embodiments of the present invention.

Reference is now also made to FIG. 4A, which is a time sequence diagram of an operation of GPIO lines of a client terminal, such as 101, having two receivers and switching units, for example as depicted in FIG. 3, according to some embodiments of the present invention. As shown in FIG. 4A, the GPIO lines are optionally controlled during three time stamps 301-303. The first time stamp 301 is defined in the interlude between frames, after the end of the transmission (Tx) session, for example after a UL frame segment, and before the beginning of a DL sub frame. The second time 302 stamp is defined after an RSSI and/or an SNR measurement over the DL preamble. The third time 303 stamp is defined after a receiving (Rx) session stops and before next transmitting (Tx) session start. While GPIO 1-3 bits are indicative of a switch to test the first receiver, GPIO 4-6 bits are indicative of a switch to receive the communication signal via the second receiver. Optionally, GPIO 7 bit is used for latching Rx bit of the antenna configuration when pulse edge rises, as shown at 304. Optionally, the latch time is less than 1 us from event appearance at the time stamp set. Optionally, GPIO 8 bit is used for latching Tx bit of the antenna configuration at pulse edge rise, as shown at 305. Optionally, the latch time is less than 1 us from the time stamp set.

Figure 4B:
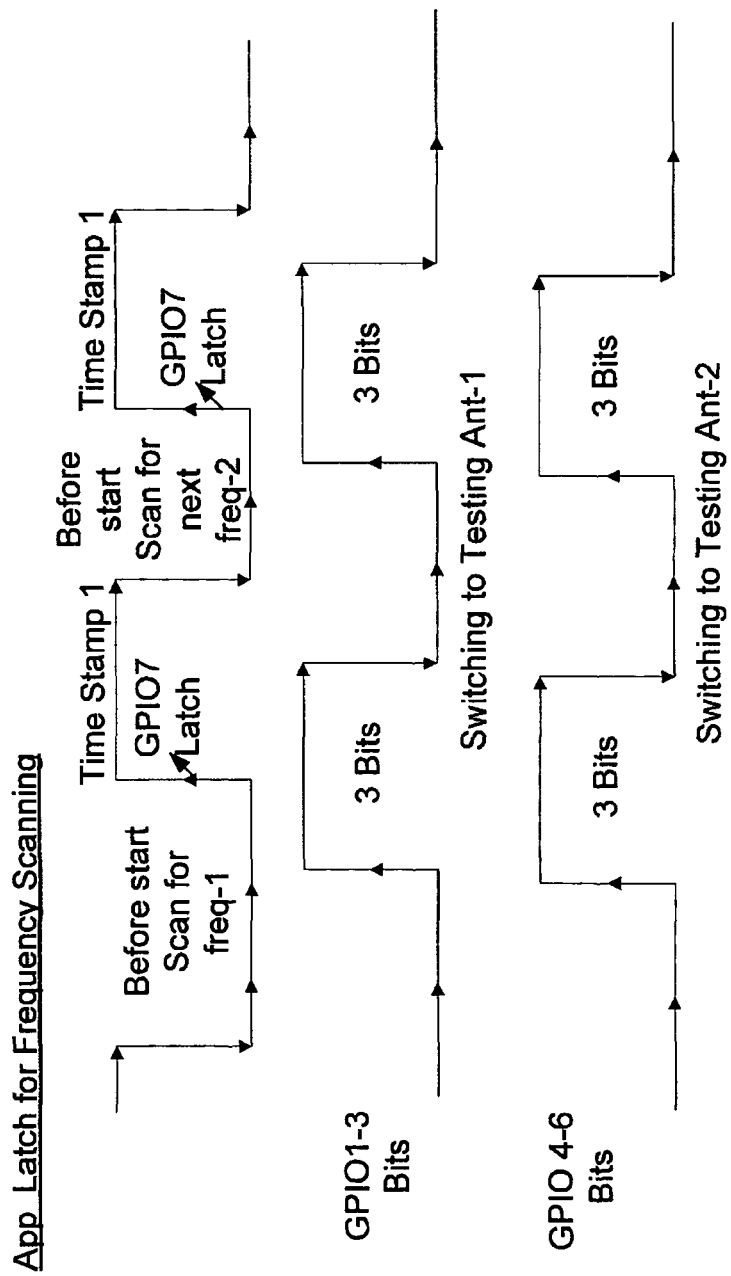
FIG. 4B is a time sequence diagram of an operation of general purpose input/output (GPIO) lines of a client terminal for frequency selection over the best antenna during network selection process, according to some embodiments of the present invention.

Optionally, the GPIOs are set to scan a plurality of frequencies. For example, as described above, the network entry process may include scanning a plurality of frequencies in a predefined range to determine the best reception frequency and the preferred BS from a predefined frequency range and predefined preferred BS subnets. For example, FIG. 4B, which is a time sequence diagram of an operation of GPIO lines of a client terminal, depicts frequency switching before the aforementioned first time stamp of each frame and/or every number of frames, according to some embodiments of the present invention. As shown at 311 and 312, while GPIO bits 1-3 are indicative of the switching to test the operational antenna, GPIO bits 4-6 are indicative of the switching to test the tested antenna.

Optionally, the CPE 101 comprises an application program interface (API) that sets the values of GPIO bits in each time stamp for switching between the antenna units 107, 157 during the periodical switching intervals. Optionally, two GPIOs are allocated for controlling the mechanism and three GPIOs are allocated for antenna selection in each antenna unit 107, 157. Optionally 3 GPIO lines are capable to select an antenna from an array of up to 8 antennas.

By setting the GPIO bits, the API enables switching between any antenna belongs to the set of antennas of the antenna unit 107 during the periodical switching intervals, for example during a frame segment such as a DL preamble. Optionally, the API adjusts the GPIO during 3 time stamps. The first time stamp is for the operational Rx antenna switching and timed to precede the frame DL preamble, for example after the transmission is ended. The first time stamp initiates the periodical switching interval. The second time stamp is for the tested Rx antenna switching after RSSI and SNR measurement during the DL preamble. The second time stamp ends the periodical switching interval and returns to the originally used antenna, which may referred to as operational antenna. The third time stamp is for best Tx antenna switching before the Tx starts.

As described above, the API controls eight GPIOs for two sets of antennas of two antenna units 107, 157. In use, the API sets the GPIO bits for each time stamp. 3 Bytes are used to set the GPIO bits for these events. Each byte includes an antenna selection for different time stamp, for example as described in FIG. 6, which is an exemplary representation of these three bytes according to some embodiments of the present invention. As depicted in FIG. 6, Bit 3 and Bit 7 of the first and second bytes describe which antenna is used by each one of the receivers. Bit 7 of the third time stamp describes which antenna is used for transmission.

Optionally, the API configures the GPIO bits in order to switch between the antennas of the antenna unit 017 and receiver 105, between the antennas of the antenna unit 157 and receiver 155 and/or between antennas of any set of antennas of antenna unit 107 or antenna unit 157 and the transmitter 403.

Optionally, the CPE 101 comprises an additional API for acquiring RSSI and SNR data from the application layer as a read during an airframe period. The RSSI and SNR data may be used for quality analysis, for example as described above.

It should be noted that though the description above focuses on reception synchronization, reception operations and reception switching, it may be implemented, mutatis mutandis, for transmission synchronization, transmission operations and transmission switching.

It is expected that during the life of a patent maturing from this application many relevant systems and methods will be developed and the scope of the term frame, frame segment, communication signal, antenna, receiver, switching unit and client terminal is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A client terminal for receiving a communication signal in a plurality of reception configurations, the communication signal having a plurality of frames, the client terminal comprising:
   an antenna unit having a plurality of reception configurations;
   a receiver;
   a switching module communicatively coupled with the antenna unit and the receiver, and which switches the antenna unit between an operational reception configuration and a testing reception configuration and provides signals received in the reception configuration and the testing configuration to the receiver; and
   a timing circuit communicatively coupled to the switching module and providing a control signal to the switching module to cause the switching module to switch to said operational reception configuration during a first predefined segment of a frame containing user data and to cause the switching module to switch to said testing reception configuration during a second predefined segment of said frame containing network management data.

2. The client terminal of claim 1, wherein said antenna unit comprises a plurality of antennas and in said operational and testing configurations said receiver is connected to operational and tested antennas of said plurality of antennas.

3. The client terminal of claim 2, wherein each said antenna is a directional antenna.

4. The client terminal of claim 1, further comprising an analysis module configured for performing a quality analysis of said operational and tested receptions.

5. The client terminal of claim 4, wherein said switching between said operational and tested receptions according to said quality analysis.

6. The client terminal of claim 4, wherein said quality analysis comprises at least one of the following analyses: a signal to noise ratio (SNR) analysis, and a received signal strength indication (RSSI).

7. The client terminal of claim 1, wherein said timing circuit synchronizes said switching to be performed every predefined number of frames.

8. The client terminal of claim 1, further comprising an additional receiver configured for receiving an additional reception of said frame based communication signal via an additional antenna unit and an analysis module configured for performing a quality analysis of said operational reception according to an additional reception via said additional antenna unit.

9. The client terminal of claim 1, wherein said second predefined frame segment is a frame preamble.

10. The client terminal of claim 1, wherein said antenna unit comprises a plurality of antennas and a selector for connecting a subset of said plurality of antennas to the receiver.

11. The client terminal of claim 1, further comprising a memory unit for recording from said operational reception a respective frame segment in at least one of a frame prior to the frame of said second predefined frame segment and a frame subsequent to the frame of said second predefined frame segment for allow using said respective frame segment instead of said second predefined frame segment.

12. A method for operating a client terminal with an antenna unit having a plurality of reception configurations in a frame based communication system, the method, comprising:
   a) connecting a receiver to receive an operational reception of a communication signal of a frame via an operational antenna configuration;
   b) switching said receiver to receive a tested reception via a tested antenna configuration during a predefined frame segment of said frame containing network management data;
   c) performing a quality analysis of said tested reception; and
   d) selectively connecting said receiver to said tested antenna configuration for a prospective reception of said communication signal if said quality analysis is indicative of a preferability of said tested reception over said operational reception.

13. The method of claim 12, wherein a) further comprises recording the predefined frame segment of a prior frame and using said recorded predefined frame segment of said prior frame for said switching.

14. The method of claim 12, wherein said predefined frame segment is selected from a group consisting of a down link preamble of a frame of said communication signal, a down link midample, and a pilot tone.

15. The method of claim 12, further comprising repeating said a)-d), wherein said operational antenna configuration is defined according to a connection made in d).

16. The method of claim 15, wherein said repeating is performed every predefined number of frames.

17. The method of claim 15, further comprising providing a plurality of antenna configurations before said a) and repeating said a)-d) in a plurality of iterations; wherein in each said iteration said operational antenna configuration is defined according to an analysis made in d) and said tested antenna configuration being sequentially selected from said plurality of antenna configurations.

18. The method of claim 12, wherein said connecting a receiver of a) comprises scanning a plurality of frequencies and tuning said receiver according to said scan.

19. The method of claim 12, wherein said quality analysis comprises at least one of the following analyses: a signal to noise ratio (SNR) analysis, and a received signal strength indication (RSSI).

20. The method of claim 12, wherein said switching of d) is initiated between two of said plurality of frames.

21. The method of claim 12, wherein said switching of d) is performed before said predefined frame segment is completely received by said receiver.

* * * * *